United States Patent
Hosokawa et al.

(10) Patent No.: US 7,557,667 B2
(45) Date of Patent: Jul. 7, 2009

(54) ANGULAR RATE SENSOR

(75) Inventors: Toshinobu Hosokawa, Yokohama (JP); Kazuhiro Ota, Yokohama (JP); Hiroshi Tanaka, Yokohama (JP); Masanori Yachi, Yokohama (JP); Hiroaki Takagi, Yokohama (JP)

(73) Assignee: Tamagawa Seiki Co., Ltd., Nagano (JP)

( * ) Notice: Subject to any disclaimer, the term of this patent is extended or adjusted under 35 U.S.C. 154(b) by 57 days.

(21) Appl. No.: 11/812,858

(22) Filed: Jun. 22, 2007

(65) Prior Publication Data

US 2008/0007360 A1 Jan. 10, 2008

(30) Foreign Application Priority Data

Jun. 27, 2006 (JP) .............................. 2006-176235

(51) Int. Cl.
*H03B 5/30* (2006.01)
(52) U.S. Cl. ....................... 331/156; 331/154; 310/370
(58) Field of Classification Search ................ 331/154, 331/156; 310/370; 73/504.16
See application file for complete search history.

(56) References Cited

U.S. PATENT DOCUMENTS

| | | | | |
|---|---|---|---|---|
| 4,220,885 A | * | 9/1980 | Yamashita et al. | 310/321 |
| 6,450,032 B1 | * | 9/2002 | Albert | 73/514.29 |
| 2005/0066727 A1 | | 3/2005 | Fujimoto et al. | |

FOREIGN PATENT DOCUMENTS

| | | |
|---|---|---|
| JP | 04-328416 A | 11/1992 |
| JP | 8-178669 | 7/1996 |
| JP | 9-203638 | 8/1997 |
| JP | 2000-292173 | 10/2000 |
| JP | 2002-195833 A | 7/2002 |
| JP | 2004-271479 A | 9/2004 |
| JP | 2005-538551 A | 12/2005 |

* cited by examiner

*Primary Examiner*—Anh Q Tran
(74) *Attorney, Agent, or Firm*—Arent Fox LLP (57) ABSTRACT

An angular rate sensor includes a tuning-fork oscillator, a support portion, an oscillation absorption portion and a mounting portion. The tuning-fork oscillator has a base and arm portions extending from the base. The support portion supports the base of the tuning-fork oscillator at a front face thereof. The oscillation absorption portion is provided on a back face of the support portion opposite to the front face. The mounting portion mounts the support portion through the oscillation absorption portion.

9 Claims, 14 Drawing Sheets

DRIVE MODE

FIG. 3B

DETECTION MODE

ANGULAR RATE SENSOR

BACKGROUND OF THE INVENTION

1. Field of the Invention

This invention generally relates to an angular rate sensor, and in particular, relates to an angular rate sensor having an oscillator.

2. Description of the Related Art

An angular sensor is a sensor detecting an angular rate during a revolution, and is used for a device avoiding a camera shake, a system such as car navigation system, a vehicle, and an attitude control system of a robot. A tuning-fork oscillator having arms on the base thereof is used for an oscillator of an angular rate sensor. In the angular rate sensor having the oscillator, oscillation of the oscillator is transmitted outside through other components. And the oscillation is changed in a case where the angular rate sensor is mounted on a system. As a result, the property of the oscillator is changed. And an external oscillation influences the oscillation of the oscillator. Therefore, an output of the angular rate sensor is changed because of the oscillation during a running of a vehicle. This possibly causes a malfunction of the system.

A following art is disclosed in order to reduce a leakage of the oscillation of the oscillator or an influence of the external oscillation to the oscillator. Japanese Patent Application Publication No. 2000-292173 (hereinafter referred to as Document 1) discloses an art where an oscillation absorption member fixes a groove portion having U shape and a supporting metal, the groove portion and the supporting metal being provided on a ceramics portion of a tuning-fork oscillator composed of a piezoelectric device and the ceramics portion. Japanese Patent Application Publication No. 9-203638 (hereinafter referred to as Document 2) discloses an art where a tuning-fork oscillator is mounted on a substrate and both ends of the substrate are fixed with an oscillation absorption portion. Japanese Patent Application Publication No. 8-178669 (hereinafter referred to as Document 3) discloses an art where a base surrounding a tuning-fork oscillator is provided and the both ends of the base is fixed with an oscillation absorption portion.

In a case where the tuning-fork oscillator oscillates in a direction vertical to a face therefore, a member (a ceramics portion in Document 1, a support substrate in Document 2 and a base in Document 3) supporting the oscillator oscillates so that a counter balance is achieved, in the arts in accordance with the Document 1 through Document 3. In Document 1 through Document 3, a member of which amplitude is large holds a member supporting the oscillator. It is difficult to restrain a leakage of the oscillation of the oscillator and an influence of the external oscillation to the oscillator.

SUMMARY OF THE INVENTION

The present invention provides an angular rate sensor restraining a leakage of an oscillation of an oscillator and an influence of an external oscillation to the oscillator.

According to an aspect of the present invention, preferably, there is provided an angular rate sensor including a tuning-fork oscillator, a support portion, an oscillation absorption portion and a mounting portion. The tuning-fork oscillator has a base and arm portions extending from the base. The support portion supports the base of the tuning-fork oscillator at a front face thereof. The oscillation absorption portion is provided on a back face of the support portion opposite to the front face. The mounting portion mounts the support portion through the oscillation absorption portion.

With the above-mentioned configuration, it is possible to restrain that the oscillation of the tuning-fork oscillator in a mode of oscillation vertical to the face thereof is transmitted to the mounting portion. And it is possible to restrain that the oscillation of the mounting portion influences the oscillation mode of the tuning-fork oscillator.

According to another aspect of the present invention, preferably, there is provided an angular rate sensor including a mounting portion, a fixing portion and a heavy weight. The mounting portion mounts an oscillator. The mounting portion is fixed to the fixing portion. The heavy weight is fixed to the fixing portion and is separated from the mounting portion.

With the above-mentioned configuration, it is possible to restrain the oscillation of the fixing portion even if the mounting portion oscillates, because of an inertia moment of the heavy weight.

BRIEF DESCRIPTION OF THE DRAWINGS

Preferred embodiments of the present invention will be described in detail with reference to the following drawings, wherein:

FIG. 3B illustrates a side view of the support portion in accordance with the comparative embodiment.

DESCRIPTION OF THE PREFERRED EMBODIMENTS

A description will now be given, with reference to the accompanying drawings, of embodiments of the present invention.

First Embodiment

Figure 1A:
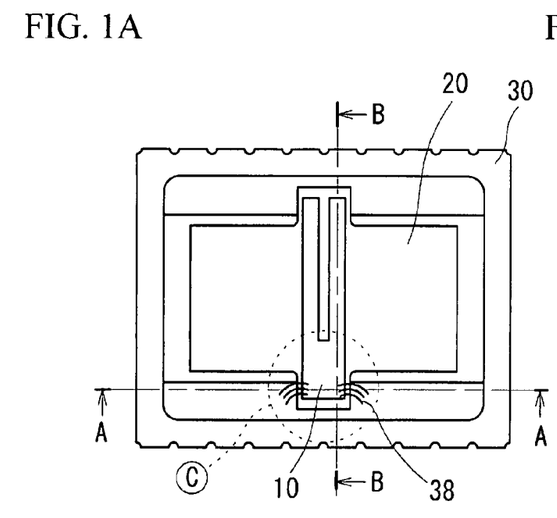
FIG. 1A illustrates a top view of an angular rate sensor in accordance with a first embodiment.
Figure 1B:
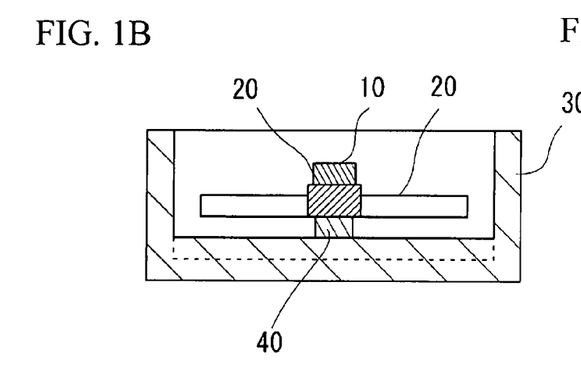
FIG. 1B illustrates a cross sectional view taken along a line A-A of FIG. 1A.
Figure 1C:
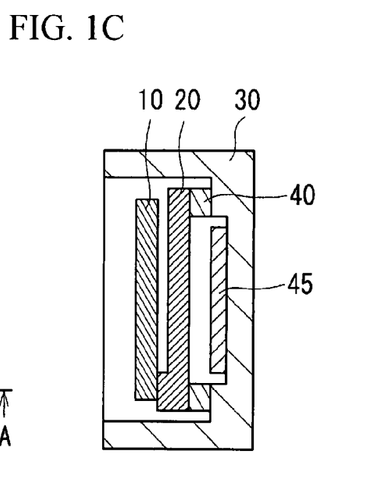
FIG. 1C illustrates a cross sectional view taken along a line B-B of FIG. 1A.
Figure 1D:
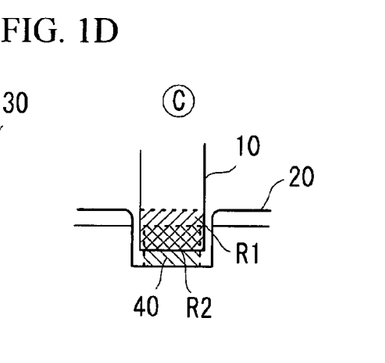
FIG. 1D illustrates a positional relationship between a tuning-fork oscillator, a support portion and an oscillation absorption portion.

A first embodiment is an example of an angular rate sensor having a structure in which a tuning-fork oscillator is mounted on a package acting as a mounting portion. FIG. 1A illustrates a top view of the angular rate sensor in accordance with the first embodiment. FIG. 1B illustrates a cross sectional view taken along a line A-A of FIG. 1A. FIG. 1C illustrates a cross sectional view taken along a line B-B of FIG. 1A. FIG. 1D illustrates a positional relationship between a tuning-fork oscillator 10, a support portion 20 and an oscillation absorption portion 40 in a case where a region C of FIG. 1A is viewed from above.

As shown in FIG. 1A, a base of the tuning-fork oscillator 10 is fixed to and supported by a front face of the support portion 20. The support portion 20 is, for example, composed of stainless steel. The oscillation absorption portion 40 composed of such as silicon rubber is provided on a back face of the support portion 20 opposite to the front face by which the base of the tuning-fork oscillator 10 is supported. The support portion 20 is fixed to and mounted on a package 30 (a mounting portion) composed of such as ceramics through the oscillation absorption portion 40. An electrode (not shown) of the tuning-fork oscillator 10 and a pad (not shown) of the package 30 are coupled to each other through a bonding wire 38. A circuit 45 controlling the tuning-fork oscillator 10 is provided under the support portion 20.

As shown in FIG. 1D, an area where a base 13 of the tuning-fork oscillator 10 is fixed to the front face of the support portion 20 is projected on the back face of the support portion 20, and the area of the back face is referred to as R1. An area where the oscillation absorption portion 40 is fixed to the support portion 20 is referred to as R2.

Figure 2:
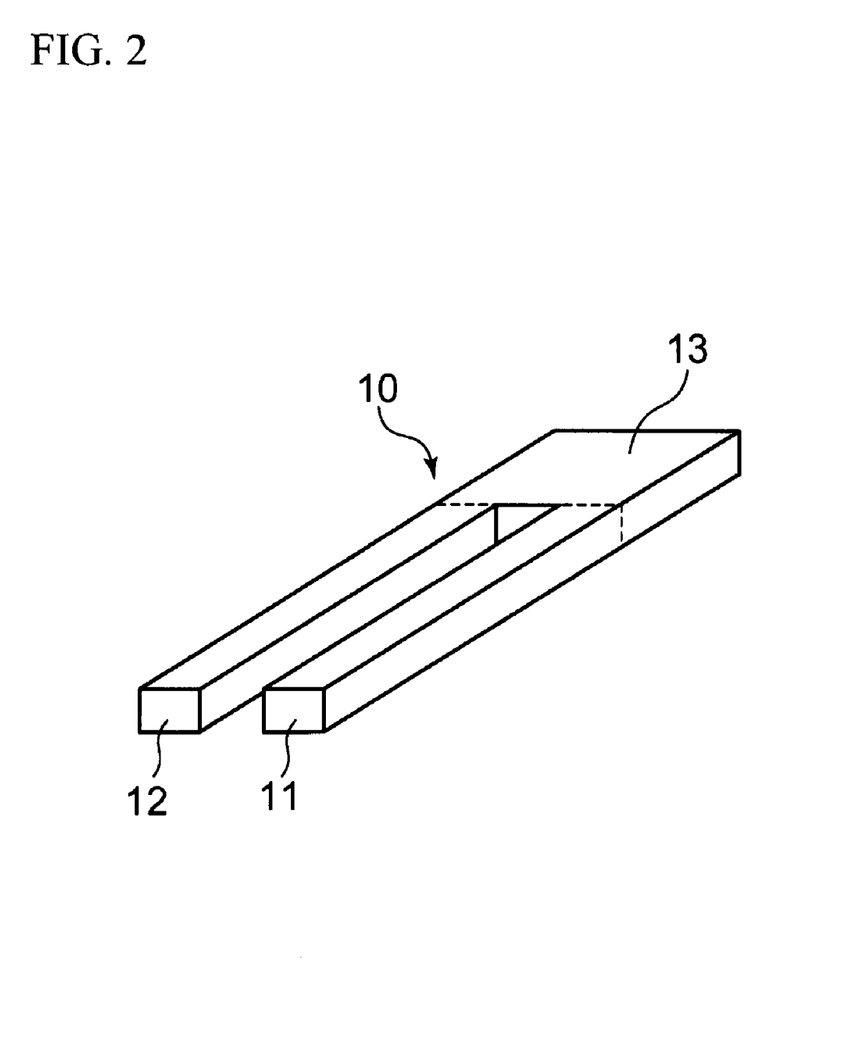
FIG. 2 illustrates a perspective view of a tuning-fork oscillator.

As shown in FIG. 2, the tuning-fork oscillator 10 has the base 13 and two (more than one) arm portions 11 and 12 extending from the base 13. The tuning-fork oscillator 10 is, for example, composed of piezoelectric material such as LiNbO₃ (lithium niobate) or LiTaO₃ (lithium tantalate). High k23 electromechanical coupling coefficient is obtained when a Y-plate ranging from 130 degrees to 140 degrees is used, in a case where LiNbO₃ (lithium niobate) or LiTaO₃ (lithium tantalate) is used. The tuning-fork oscillator 10 has an electrode (not shown) that is composed of a metal film of Au (gold), Al (aluminium) or Cu (copper) and that is formed on the front face thereof.

Figure 3A:
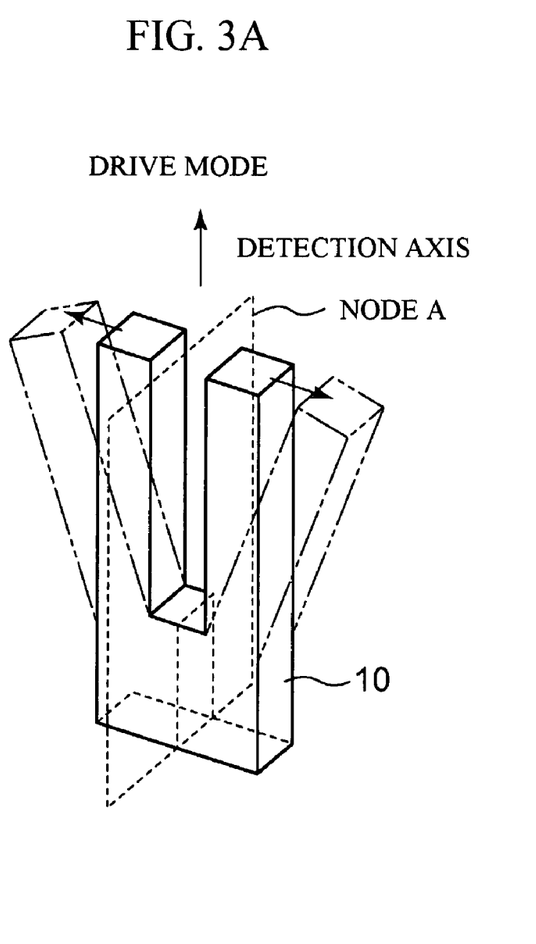
FIG. 3A and FIG. 3B illustrate an oscillation mode of a tuning-fork oscillator.
Figure 3B:
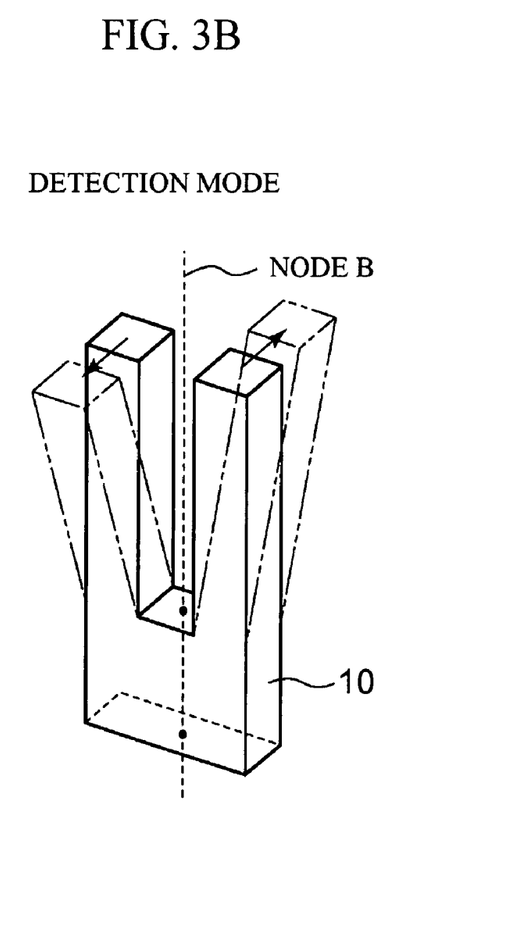

FIG. 3A and FIG. 3B illustrate a drive mode and a detection mode of the tuning-fork oscillator 10. As shown in FIG. 3A, an oscillation mode in which the arm portions 11 and 12 open and shut with each other is generated when a drive signal is fed into a drive electrode (not shown) of the tuning-fork oscillator 10. This oscillation is in parallel with a face direction of the arm portions 11 and 12. This is an in-plane oscillation mode.

Here, as shown in FIG. 3B, an oscillation mode, in which the arm portions 11 and 12 oscillate back and forth, is generated because of a Coriolis force, when an angular rate is applied to a detection axis. This oscillation is a twist oscillation vertical to the face of the arm portions 11 and 12. This is a plane-vertical oscillation mode. It is possible to detect an angular rate centering on the detection axis when a detection electrode (not shown) detects this oscillation mode.

An oscillation mode for drive is referred to a drive mode. An oscillation mode for detection is referred to a detection mode. A region without oscillation is referred to a node. In FIG. 3A, a symmetry plane of the tuning-fork oscillator 10 is a node A. In FIG. 3B, a center axis of the tuning-fork oscillator 10 is a node B.

As shown in FIG. 3B, the support portion 20 oscillates so that a counter balance is achieved, when the tuning-fork oscillator 10 oscillates in the plane-vertical oscillation mode. And so, the oscillation absorption portion 40 is provided on the back face of the support portion 20 (opposite to the front face supporting the base 13). Therefore, the oscillation absorption portion can absorb the oscillation in the plane-vertical oscillation mode.

Figure 4:
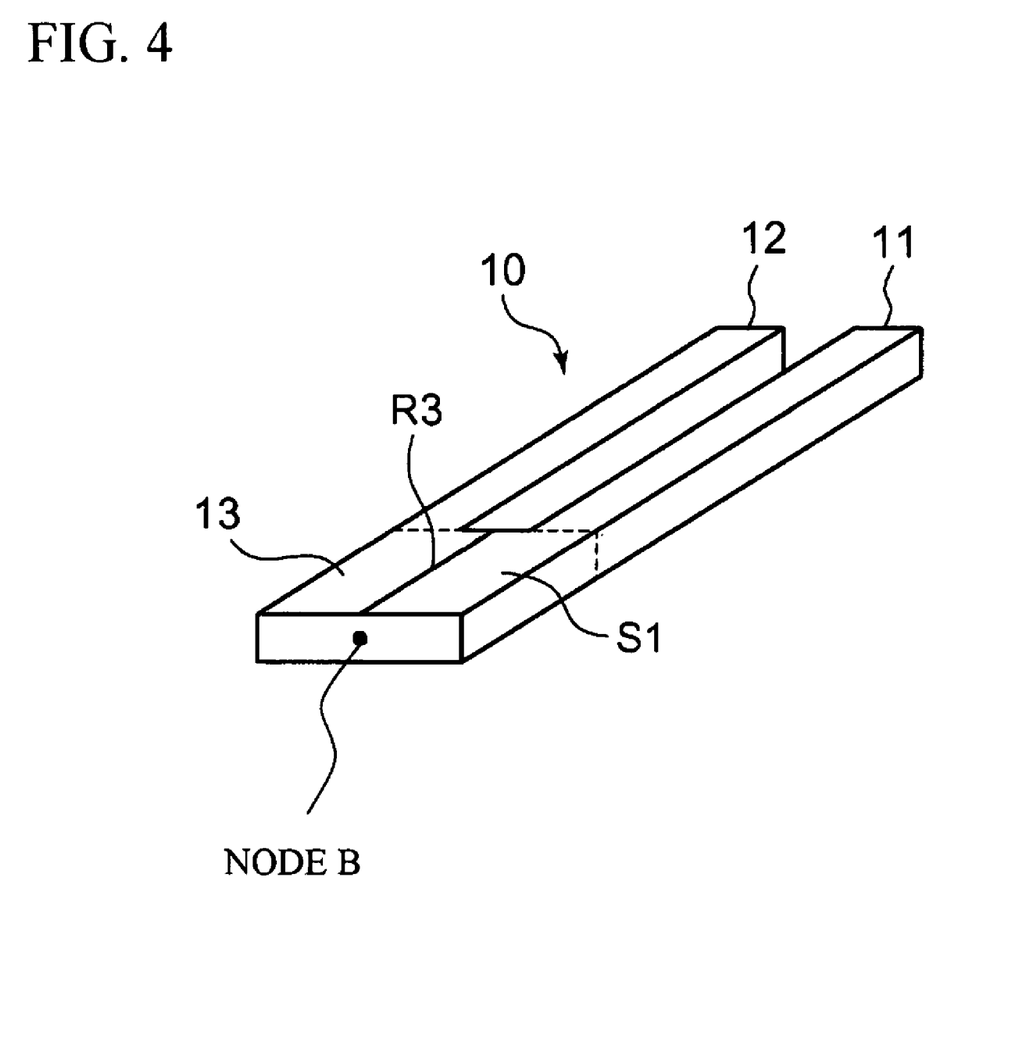
FIG. 4 illustrates region around a node of a tuning-fork oscillator.

As shown in FIG. 3A and FIG. 3B, amplitude of the base 13 is small in a case where the tuning-fork oscillator 10 oscillates in the in-plane oscillation mode or in the plane-vertical oscillation mode. Therefore, amplitude of the support portion 20 supporting the base 13 is reduced. In this case, amplitude around the nodes A and B in FIG. 3A and FIG. 3B is more reduced. In particular, an area R3 of the base 13 in FIG. 4 is a projected area of a common node between the node A and the node B (that is, the node B) on a face S1. At the area R3, amplitude of the oscillation is the smallest. Accordingly, amplitude on a face opposite to the face supporting the base 13 is small in the oscillation of the support portion 20. It is therefore preferable that the oscillation absorption portion 40 is provided on the second area R2 including at least a part of the first area R1 that is an area of the back face on which the area of the front face supporting the base 13 is projected. It is therefore possible to restrain that the oscillation of the tuning-fork oscillator 10 is transmitted to the package 30, because the oscillation absorption portion 40 is provided near the node. And it is possible to restrain an influence of the oscillation of the package 30 on the oscillation mode of the tuning-fork oscillator 10. In particular, as shown in FIG. 1D, it is more preferable that the first area R1 includes the second area R2, because the oscillation absorption portion 40 is provided in an area of which amplitude is small.

As shown in FIG. 1A, it is preferable that the support portion 20 extends in a width direction of the arm portions 11 and 12 of the tuning-fork oscillator 10. It is therefore possible to enlarge an inertia moment necessary for the support portion 20 to achieve a counter balance in the plane-vertical oscillation mode shown in FIG. 3B. And it is possible to restrain the oscillation of the support portion 20, when the support portion 20 extends in the width direction of the arm portions 11 and 12 of the tuning-fork oscillator 10 and the inertia moment is enlarged.

Figure 5A:
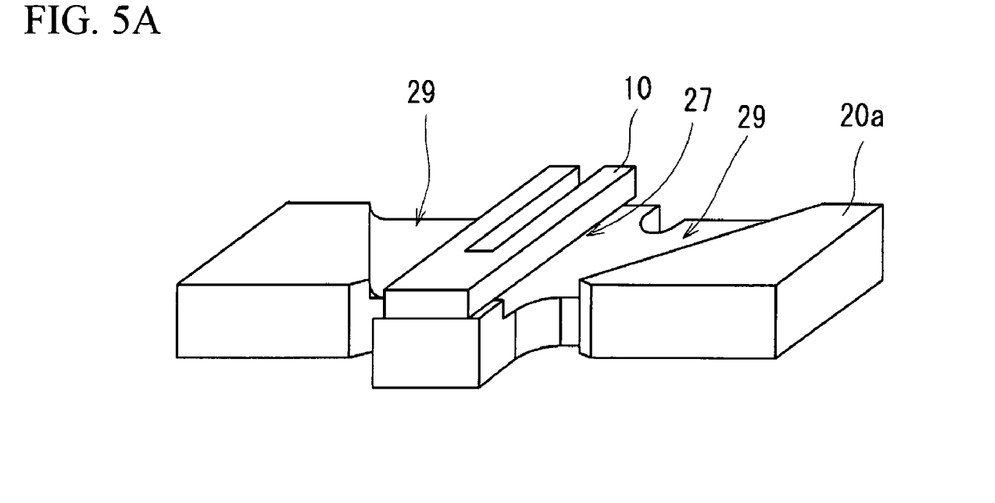
FIG. 5A illustrates a perspective view of another example 1 of a support portion.
Figure 5B:
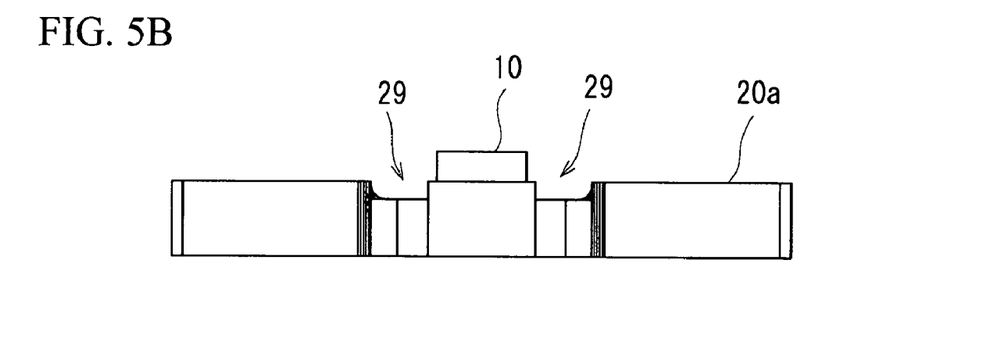
FIG. 5B illustrates a side view of the support portion.

FIG. 5A, FIG. 5B, FIG. 6A and FIG. 6B illustrate a support portion 20a as another example of the support portion 20. As shown in FIG. 5A and FIG. 5B, the support portion 20a is composed of stainless steel. The upper face of the support portion 20a is deformed with a high pressure and a recess 29 is formed. A space 27 in which the arm portions 11 and 12 oscillates is generated between the arm portions 11 and 12 of the tuning-fork oscillator 10 and the support portion 20a by the recess 29.

Figure 6A:
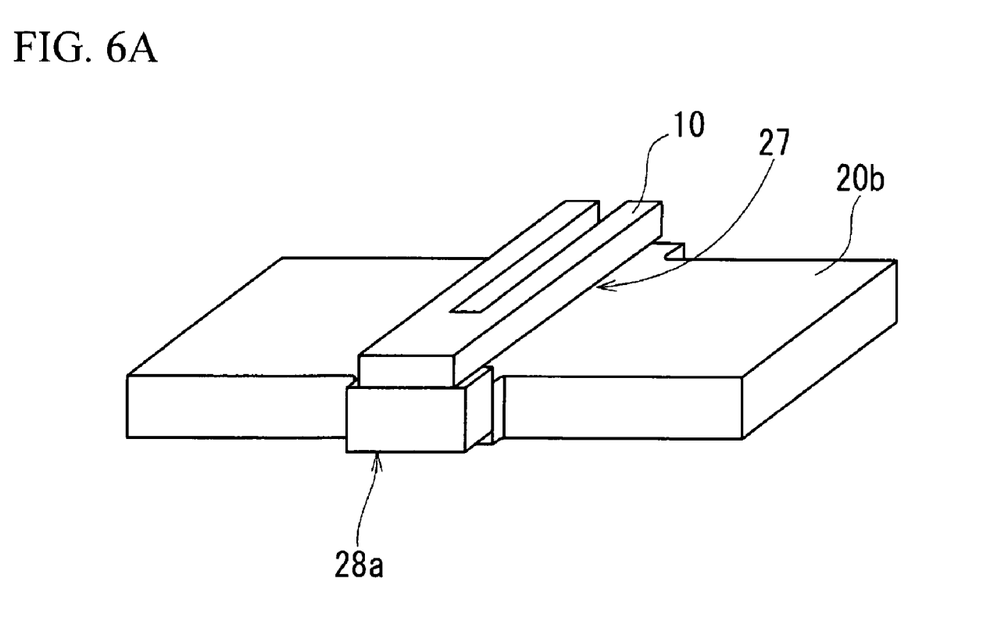
FIG. 6A illustrates a perspective view of another example 2 of a support portion.
Figure 6B:
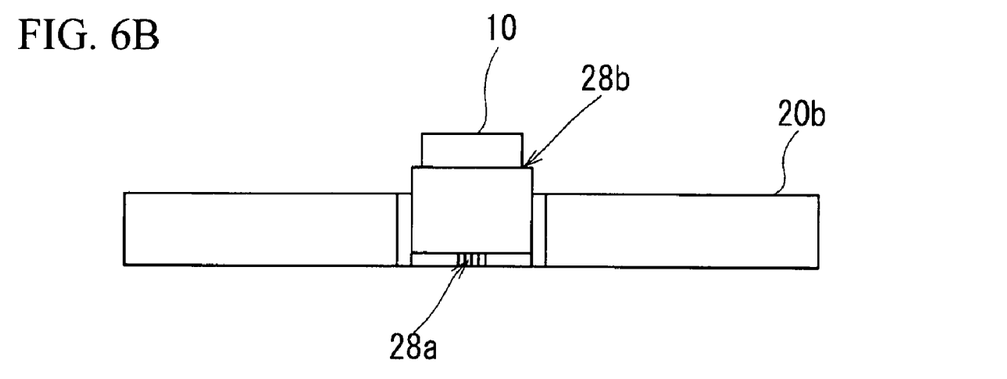
FIG. 6B illustrates a side view of the support portion.

As shown in FIG. 6A and FIG. 6B, an area of a support portion 20b except for the area supporting the base 13 is deformed with high pressure, and a recess 28a is formed. Accordingly, a convex portion 28b is formed on the opposite face of the recess 28a. The base 13 of the tuning-fork oscillator 10 is fixed to an upper face of the recess 28a. Therefore, the space 27 is generated between the arm portions 11 and 12 of the tuning-fork oscillator 10 and the support portion 20a.

Further, it is preferable that the thickness of the support portions 20a and 20b is larger than that of the tuning-fork oscillator 10. In this case, it is possible to enlarge the inertia moment of the support portions 20a and 20b and to restrain the oscillation of the support portion 20. It is therefore possible to restrain that the oscillation of the tuning-fork oscillator 10 is transmitted to the package 30.

Second Embodiment

Figure 7A:
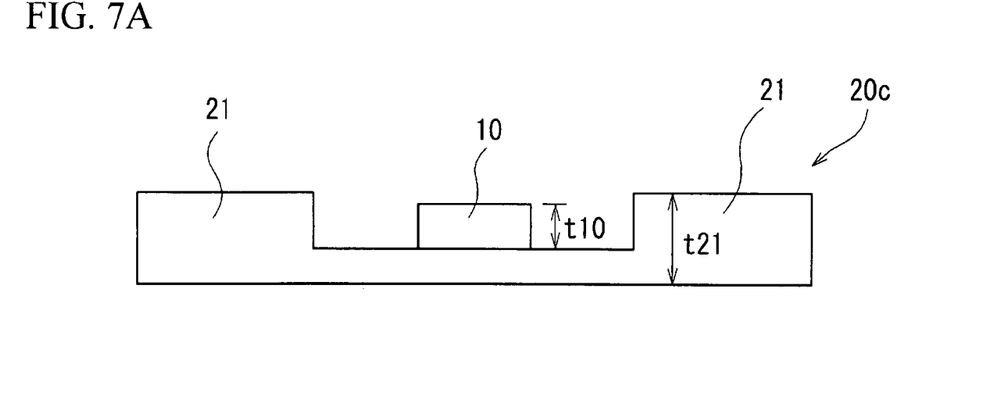
FIG. 7A and FIG. 7B illustrate a side view of a support portion in accordance with a second embodiment.
Figure 7B:
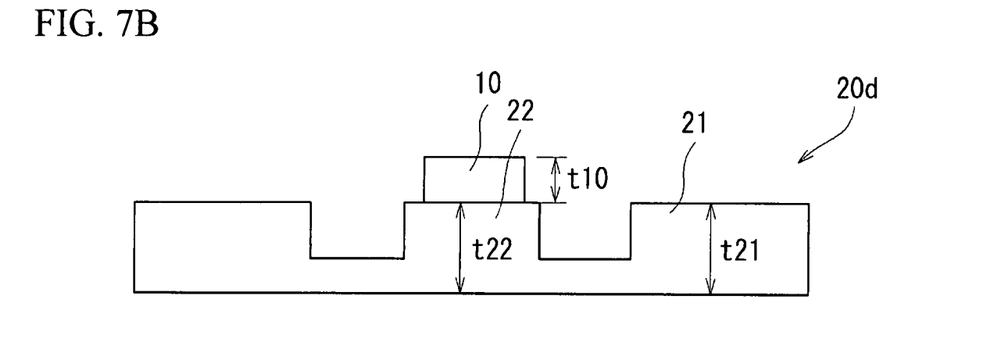

A second embodiment is a case where the thickness of an end part of the support portion is enlarged. FIG. 7A and FIG. 7B illustrate a side view of the support portion in accordance with the second embodiment viewed from the base. As shown in FIG. 7A, a thickness t21 of an end part 21 (an end part in the width direction of the arm portions 11 and 12) of a support portion 20c is larger than a thickness t10 of the tuning-fork oscillator 10. And as shown in FIG. 7B, the thickness t21 of an end part of a support portion 20d and a thickness t22 of a region 22 supporting the base 13 are larger than the thickness t10 of the tuning-fork oscillator 10. It is therefore preferable that the thickness t21 of the end part 21 is enlarged. In this case, it is possible to restrain the oscillation of the support portions 20c and 20d when the thickness of the end part 21 of which oscillation is the largest is enlarged compared to that of the tuning-fork oscillator 10 and the inertia moment of the support portions 20c and 20d is enlarged, because the support portion 20 achieve the counter balance in the plane-vertical oscillation mode.

Third Embodiment

Figure 8A:
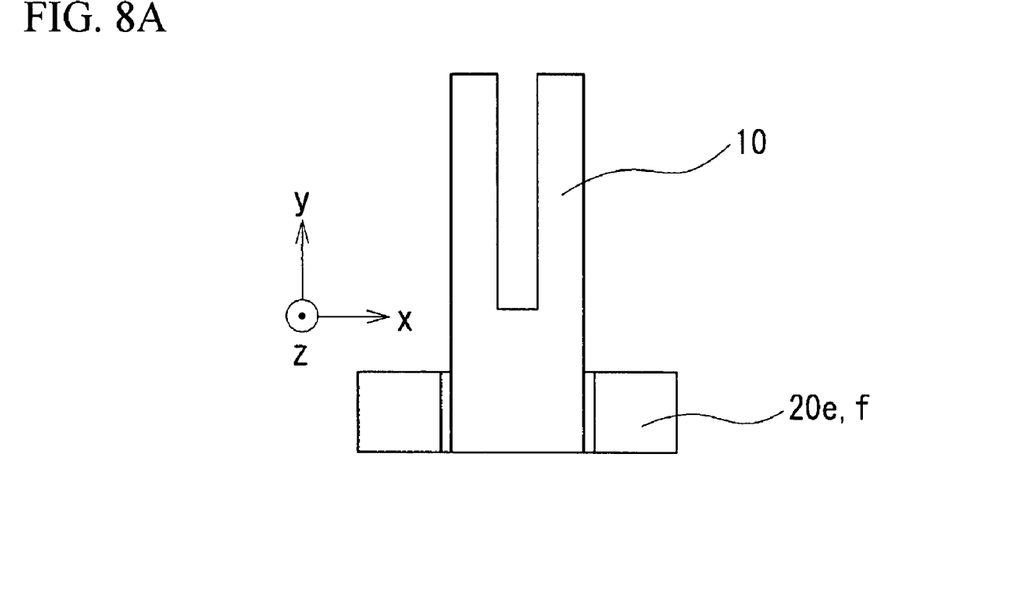
FIG. 8A illustrates a top view of a support portion in accordance with a comparative embodiment or a third embodiment.
Figure 8B:
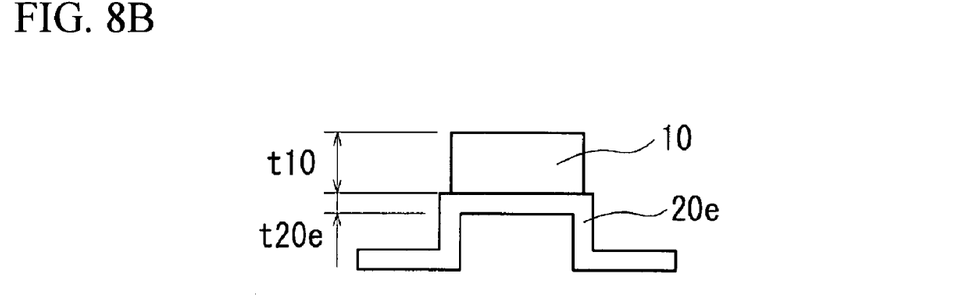
Figure 8C:
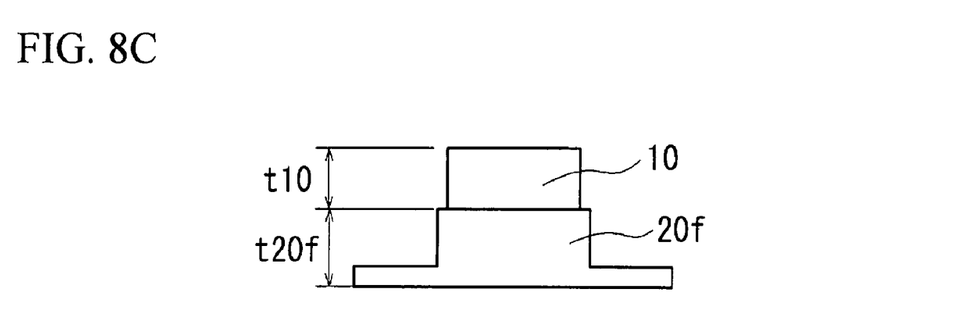
FIG. 8C illustrates a side view of the support portion in accordance with the third embodiment.

A third embodiment is a case where the thickness of the region of the support portion 20 supporting the base 13 is enlarged. FIG. 8A illustrates a top view of a support portion 20e in accordance with a comparative embodiment or a support portion 20f in accordance with a third embodiment. FIG. 8B illustrates a side view of the support portion 20e in accordance with the comparative embodiment viewed from the base 13 (a Y-direction in FIG. 8A). In the comparative embodiment, the support portion 20e is composed of a bended stainless steel (SUS 304) having a thickness of 0.1 mm. And a thickness t20e of the support portion 20e is 0.1 mm. FIG. 8C illustrates a side view of the support portion 20f in accordance with the third embodiment viewed from the base. The support portion 20f is composed of a stainless steel (SUS 304) having a thickness t20f of 0.4 mm and has a block shape. The thickness t10 of the tuning-fork oscillator 10 is 0.3 mm.

Figure 9:
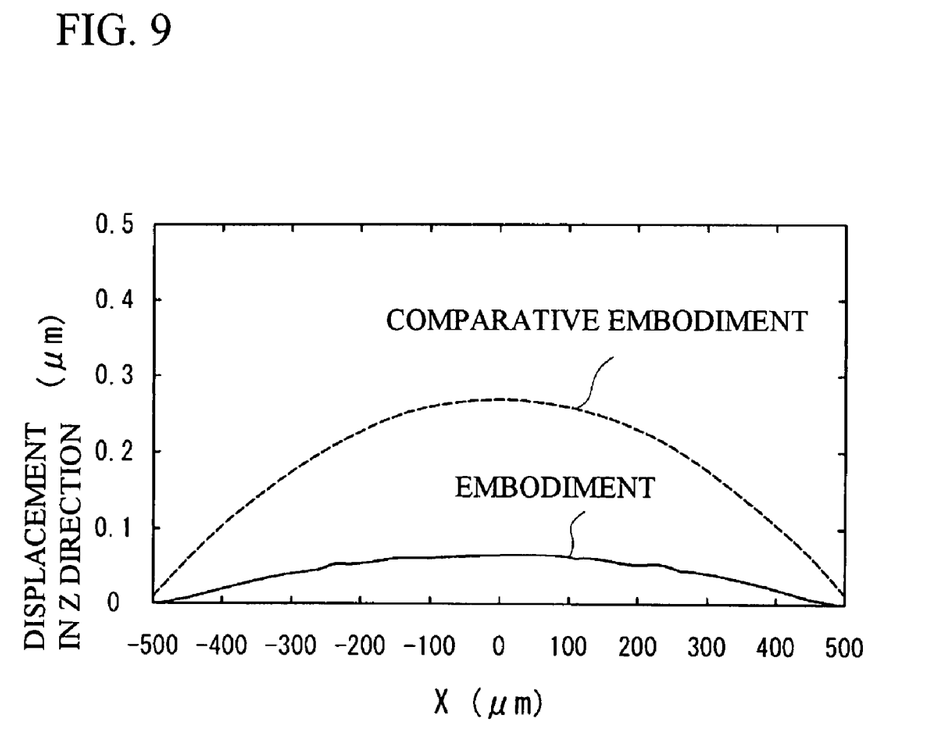
FIG. 9 illustrates a calculation result of deformation of the support portions in a case where a reflow temperature of the support portions in accordance with the third embodiment and the comparative embodiment is 260 degrees C.

FIG. 9 illustrates a displacement of a mounting face of the support portions 20f and 20e supporting the base in a case where a temperature of the support portions in accordance with the third embodiment and the comparative embodiment is 260 degrees C. (a reflow temperature using Pb-free solder). In other words, FIG. 9 illustrates a calculated result of a displacement in a Z-direction with respect to the X-coordinate in FIG. 8A. In the calculation, a thermal expansion coefficient of the tuning-fork oscillator 10 in the X-direction and the Y-direction is 17 ppm/degrees C. and 6 ppm/degrees C. respectively. A thermal expansion coefficient of the support portions 20e and 20f is 17.1 ppm/degrees C. As shown in FIG. 9, the displacement in the Z-direction is reduced, when the thickness of the support portion is increased as in the case of the third embodiment. It is therefore possible to restrain a crack of the tuning-fork oscillator 10 caused by a differential of the thermal expansion coefficients.

Figure 10:
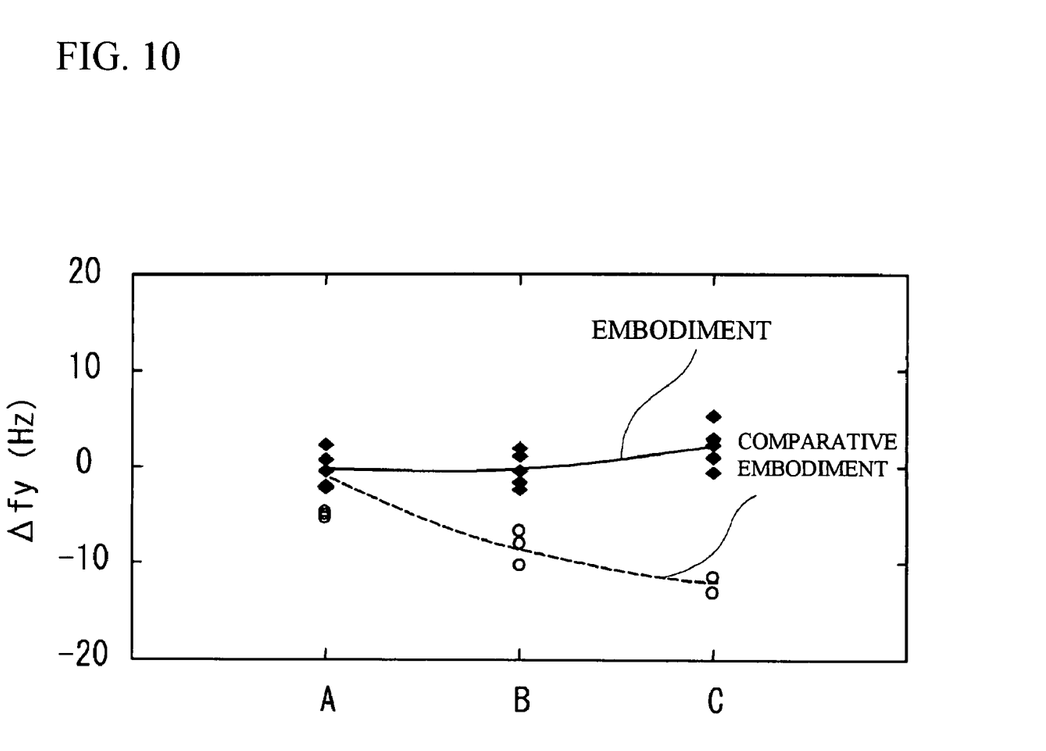
FIG. 10 illustrates a frequency change of a resonance frequency in a case where the support portions in accordance with the third embodiment and the comparative embodiment are subjected to the reflow.

FIG. 10 illustrates a frequency change of a resonance frequency of the tuning-fork oscillator 10 in a case where the support portions in accordance with the third embodiment and the comparative embodiment are subjected to the reflow at the temperature of 260 degrees C. "A" is a value before the reflow. "B" is a result after the reflow is performed once. "C" is a result after the reflow is performed three times. In the comparative embodiment, the resonance frequency is changed. In contrast, in the third embodiment, the resonance frequency is changed little. It is thus possible to improve the reflow resistance when the thickness t20f of the support portion 20f is enlarged. This is because the mounting face of the support portion 20 supporting the base is deformed with thermal history as shown in FIG. 10.

In accordance with the third embodiment, it is preferable that the thickness of the region of the support portion 20 supporting the base 13 is larger than the thickness t10 of the tuning-fork oscillator 10. In accordance with the first embodiment through the third embodiment, it is preferable that a thickness of at least a part of the support portion 20 is larger than that of the tuning-fork oscillator 10. It is more preferable that at least one of the thicknesses of the region of the support portion 20 supporting the base and the end part 21 of the support portion 20 is larger than that of the tuning-fork oscillator 10.

It is preferable that the thermal expansion coefficient of the support portions 20e and 20f is approximately as same as that of the tuning-fork oscillator 10 in order to restrain the crack or a property fluctuation of the tuning-fork oscillator 10 caused by the thermal history as shown in FIG. 9 and FIG. 10. A piezoelectric material such as $LiTaO_3$ or $LiNbO_3$ composing the tuning-fork oscillator 10 is brittle with respect to tensile stress. It is therefore preferable that the thermal expansion coefficient of the support portions 20e and 20f is more than that of the tuning-fork oscillator 10, in order that the crack of the tuning-fork oscillator 10 with the tensile stress is not generated when the adhesive agent is cooled to room temperature after the adhesive agent is hardened at high temperature during the adhesive joining between the tuning-fork oscillator 10 and the support portion 20.

Fourth Embodiment

Figures 11A, 11C:
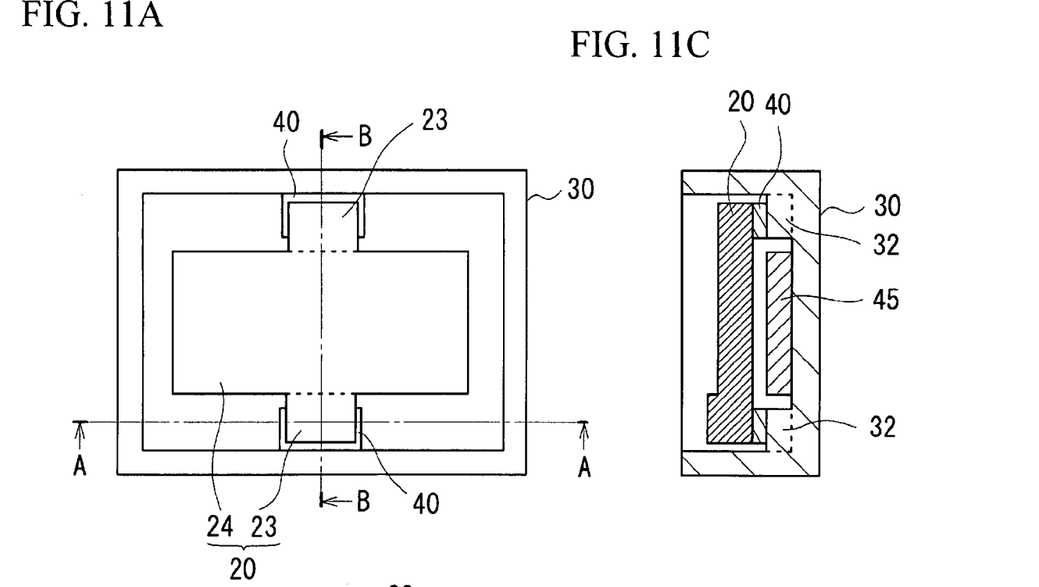
FIG. 11A illustrates a top view of an angular rate sensor in accordance with a fourth embodiment.
FIG. 11C illustrates a cross sectional view taken along a line B-B of FIG. 11A.
Figure 11B:
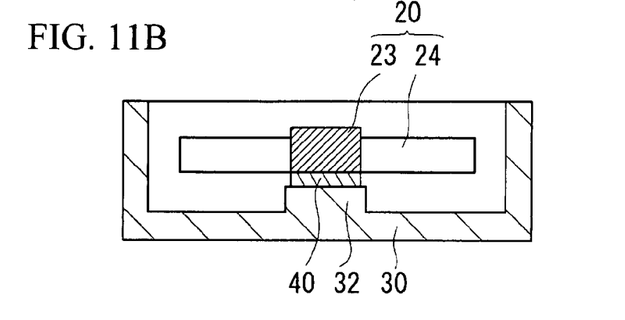
FIG. 11B illustrates a cross sectional view taken along a line A-A of FIG. 11A.

FIG. 11A through FIG. 11C illustrate the support portion 20, the oscillation absorption portion 40 and the package 30 in accordance with a fourth embodiment. The tuning-fork oscillator is not illustrated. The support portion 20 has a projection portion 23 projecting toward a side face direction of the support portion 20 from the face supporting the base and a main body 24. The projection portion 23 is mounted on a step portion 32 projecting from the bottom face of the package 30 through the oscillation absorption portion 40. It is thus possible to provide a space between the support portion 20 and the bottom face of the package 30. It is therefore possible to arrange the circuit 45 in the space. It is possible to provide a space between the support portion 20 and the package 30 when the oscillation absorption portion 40 is thick, even if the package 30 does not have the step portion 32.

The package 30 may hold the support portion 20 at a region of the support portion 20 of which amplitude of the oscillation is small, because the two projection portions 23 are provided under the node of the tuning-fork oscillator 10. It is therefore possible to restrain that the oscillation of the support portion 20 is transmitted to the package 30.

Fifth Embodiment

Figures 12A, 12C:
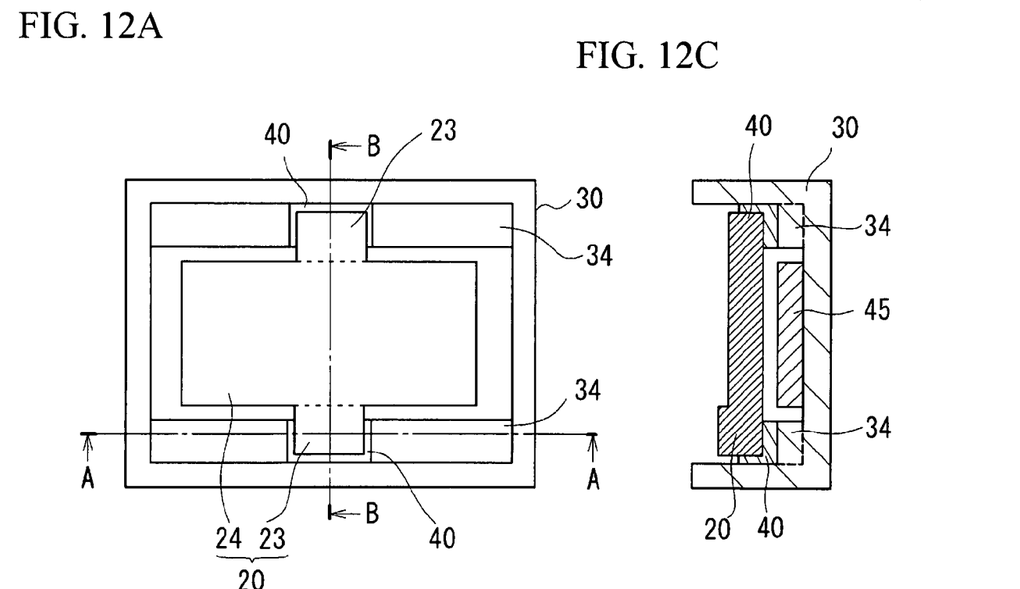
FIG. 12A illustrates a top view of an angular rate sensor in accordance with a fifth embodiment.
FIG. 12C illustrates a cross sectional view taken along a line B-B of FIG. 12A.
Figure 12B:
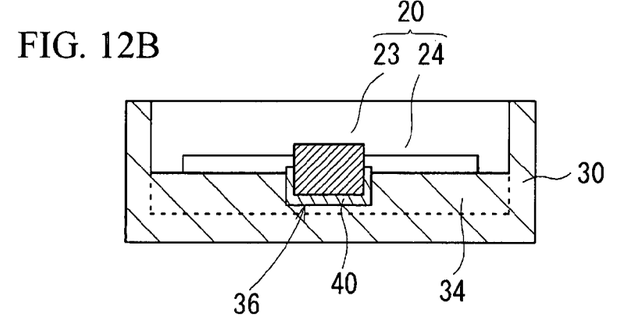
FIG. 12B illustrates a cross sectional view taken along a line A-A of FIG. 12A.

FIG. 12A through FIG. 12C illustrate the support portion 20, the oscillation absorption portion 40 and the package 30 in accordance with a fifth embodiment. The tuning-fork oscillator is not illustrated. A recess 36 is formed on a step portion 34 of the package 30. The projection portion 23 of the support portion 20 is fitted into the recess 36. It is therefore easy to align positions of the support portion 20 and the package 30 when the support portion 20 and the package 30 are assembled. The support portion 20 is mounted on the package 30 through the oscillation absorption portion 40 at the back face and the side face of the projection portion 23. The support portion 20 is thus mounted near a center of gravity of the support portion 20. It is therefore possible to restrain that the oscillation of the support portion 20 is under an influence of the external oscillation in a lateral direction.

Sixth Embodiment

Figure 13A:
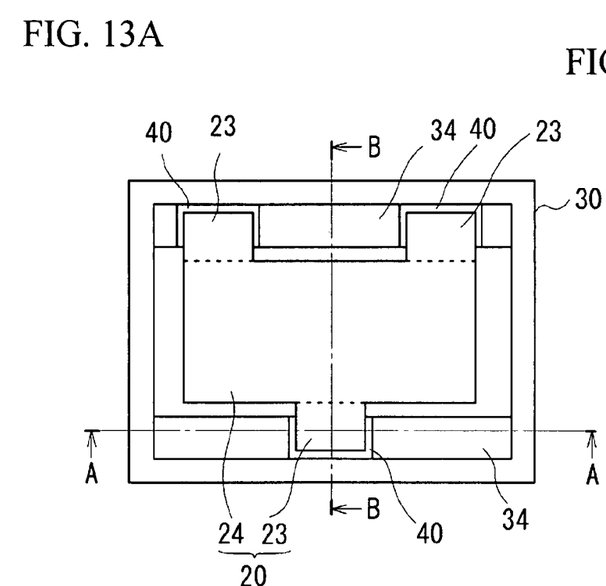
FIG. 13A illustrates a top view of an angular rate sensor in accordance with a sixth embodiment.
Figure 13B:
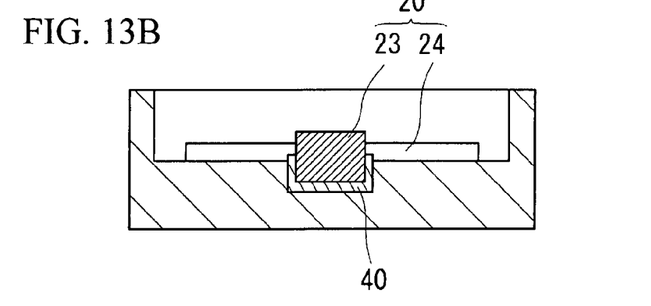
FIG. 13B illustrates a cross sectional view taken along a line A-A of FIG. 13A.
Figure 13C:
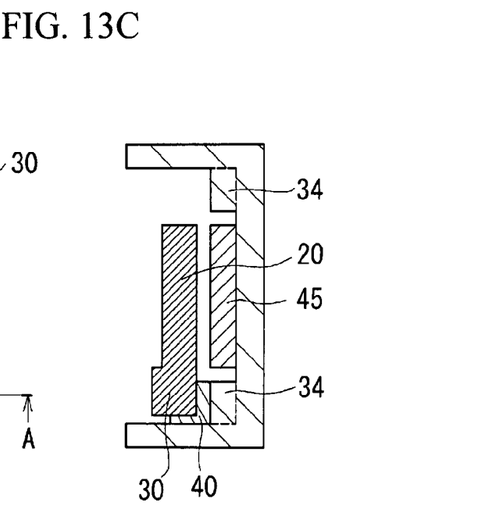
FIG. 13C illustrates a cross sectional view taken along a line B-B of FIG. 13A.

FIG. 13A through FIG. 13C illustrate the support portion 20, the oscillation absorption portion 40 and the package 30 in accordance with a sixth embodiment. The tuning-fork oscillator is not illustrated. The projection portion 23 is provided at three positions on the support portion 20. The number of the projection portions 23 may be more than three, as is in the case of the sixth embodiment.

Seventh Embodiment

Figure 14A:
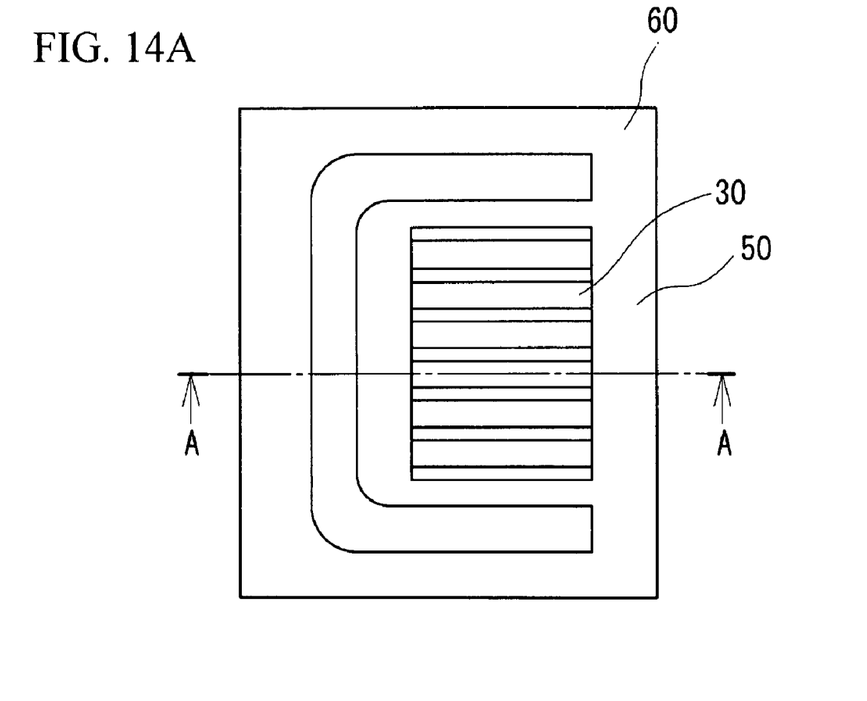
FIG. 14A illustrates a top view of an angular rate sensor in accordance with a seventh embodiment.
Figure 14B:
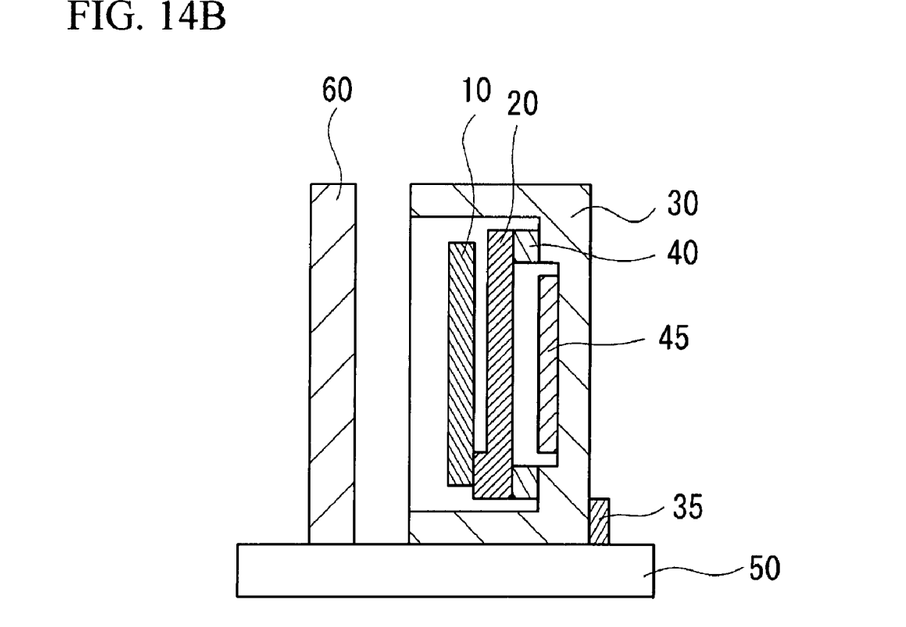
FIG. 14B illustrates a cross sectional view taken along a line A-A of FIG. 14A.

FIG. 14A illustrates a top view of an angular rate sensor in accordance with a seventh embodiment. FIG. 14B illustrates a cross sectional view taken along a line A-A in FIG. 14A. As shown in FIG. 14A and FIG. 14B, the package 30 is fixed to a fixing portion 50 that is a base composed of a mold resin. A heavy weight 60 separated from the package 30 is fixed to the fixing portion 50. The tuning-fork oscillator 10 and the support portion 20 are mounted on the package 30 through the oscillation absorption portion 40 in the package 30, as is the case of the first embodiment shown in FIG. 1A through FIG. 1C. An electrode 35 is provided on the package 30 in order to input and output an electrical signal of the angular rate sensor.

In accordance with the seventh embodiment, the heavy weight 60 is separated from the package 30 and is fixed to the fixing portion 50. Therefore, an oscillation of the fixing portion 50 is restrained because of an inertia moment of the heavy weight 60, even if the package 30 oscillates. It is preferable that the heavy weight 60 has a C shape surrounding the package 30. In this case, the inertia moment of the heavy weight 60 is enlarged and the oscillation of the fixing portion 50 is restrained. It is preferable that mass of the heavy weight 60 is larger than that of the package 30 mounting the tuning-fork oscillator 10 and the support portion 20. In this case, the inertia moment of the heavy weight 60 is more enlarged and the oscillation of the fixing portion 50 is more restrained. An oscillator such as a vibratory oscillator achieves the same effect, although the tuning-fork oscillator 10 is described in the seventh embodiment.

A substrate may be used if the substrate mounts the support portion 20, although the package 30 is described as a mounting portion in the above embodiments. The support portion 20 is not limited to the stainless steel. It is preferable that the support portion 20 is composed of a material such as copper having a high linear thermal expansion coefficient. It is preferable that the support portion 20 is composed of a material having a high density in order to enlarge the inertia moment. The oscillation absorption portion 40 may be composed of an elastic material such as a rubber such as a butyl rubber, polyurethane rubber besides silicon rubber or other elastic materials. The oscillation absorption portion 40 may join the support portion 20 and the mounting portion. It is preferable that the oscillation absorption portion 40 has an elasticity coefficient higher than that of a member joining the tuning-fork oscillator 10 and the support portion 20 for oscillation absorption. The fixing portion 50 may be a mounting substrate of a system if the substrate is a member fixing the support portion 20, although the fixing portion 50 is an example of the base composed of a mold resin. It is preferable that the heavy weight 60 is composed of a metal having a high density such as iron or stainless steel.

While the preferred embodiments of the prevent invention have been illustrated in detail, the invention is not limited to the specific embodiments above. In addition, it will be appreciated that the invention is susceptible of modification, variation and change without departing from the proper and fair meaning of the accompanying claims.

The present invention is based on Japanese Patent Application No. 2006-176235 filed on Jun. 27, 2006, the entire disclosure of which is hereby incorporated by reference.

What is claimed is:

1. An angular rate sensor comprising:
   a tuning-fork oscillator having a base and arm portions extending from the base;
   a support portion supporting the base of the tuning-fork oscillator at a front face thereof;
   an oscillation absorption portion provided on a back face of the support portion opposite to the front face; and
   a mounting portion mounting the support portion through the oscillation absorption portion;
   wherein the oscillation absorption portion is provided on a second area including at least a part of a first area of the back face on which an area of the front face supporting the base is projected.

2. The angular rate sensor as claimed in claim 1, wherein a thickness of at least a part of the support portion is larger than that of the tuning-fork oscillator.

3. The angular rate sensor as claimed in claim 2, wherein at least one of the thicknesses of a region of the support portion supporting the base and an end part of the support portion is larger than that of the tuning-fork oscillator.

4. The angular rate sensor as claimed in claim 1, wherein the support portion has a projection portion projecting toward a side face direction the support portion from the face supporting the base and is mounted on the mounting portion with the projection portion through the oscillation absorption portion.

5. The angular rate sensor as claimed in claim 4, wherein the support portion is mounted on the mounting portion through the oscillation absorption portion at a back face and a side face of the projection portion.

6. The angular rate portion as claimed in claim 1, wherein a thermal expansion coefficient of the support portion is more than that of the tuning-fork oscillator.

7. The angular rate sensor as claimed in claim 1 further comprising:

a fixing portion to which the mounting portion is fixed; and
a heavy weight that is fixed to the fixing portion and is separated from the mounting portion.

8. The angular rate sensor as claimed in claim 7, wherein the heavy weight has a C shape surrounding the mounting portion.

9. The angular rate sensor as claimed in claim 7, wherein mass of the heavy weight is larger than that of the mounting portion mounting the tuning-fork oscillator and the support portion.

* * * * *